INVENTOR.
WALTER M. BORER
BY
ATTORNEY

INVENTOR.
WALTER M. BORER

Feb. 24, 1953 W. M. BORER 2,629,409
APPARATUS FOR FORMING ELECTRICAL STRAIN GAUGES
Filed Feb. 10, 1947 4 Sheets-Sheet 4

INVENTOR.
WALTER M. BORER
BY Wm R Lane
ATTORNEY

Patented Feb. 24, 1953

2,629,409

UNITED STATES PATENT OFFICE 2,629,409

APPARATUS FOR FORMING ELECTRICAL STRAIN GAUGES

Walter M. Borer, Santa Monica, Calif., assignor to North American Aviation, Inc.

Application February 10, 1947, Serial No. 727,578

2 Claims. (Cl. 140—71)

This invention pertains to a method of manufacturing electrical strain gauges and a machine therefor. Such gauges usually take the form of a resistance wire of a diameter in the neighborhood of .001″ cemented between two sheets of thin paper. The wire, in the usual form, is of continuous length laid in a series of elongated loops with suitable leads for connecting to a galvanometer or other indicating instrument. Gauges of this type are cemented or otherwise attached, in a manner well known in the art, to a member to be subjected to stress. Such stress is measured by a change in the electrical resistance of the wire as a result of deflection of the surface to which the gauges are cemented or otherwise fastened. As is well known in the prior art, any variation in the length of this resistance wire through stretching, contraction, or deflection, in response to stress or strain in the member to which it is attached will alter its resistance value in proportion to the stress or strain. Accordingly, it is quite important that the gauge be made accurately and that the characteristics of successive gauges be uniform.

It is therefore an object of this invention to provide a mechanism for forming such gauges uniformly and to a high degree of accuracy.

It is a further object of this invention to provide an apparatus for forming electrical strain gauges which can be operated by relatively unskilled labor and which avoids the tedious and exacting operations of a highly skilled person.

It is a further object of this invention to provide a machine upon which electrical strain gauges of various sizes and characteristics and of high quality can be formed with facility by an ordinary operator.

Other objects of invention will become apparent from the following description, in which Fig. 1 is an isometric view, with parts broken away, showing a machine constituting the invention;

Figure 1:
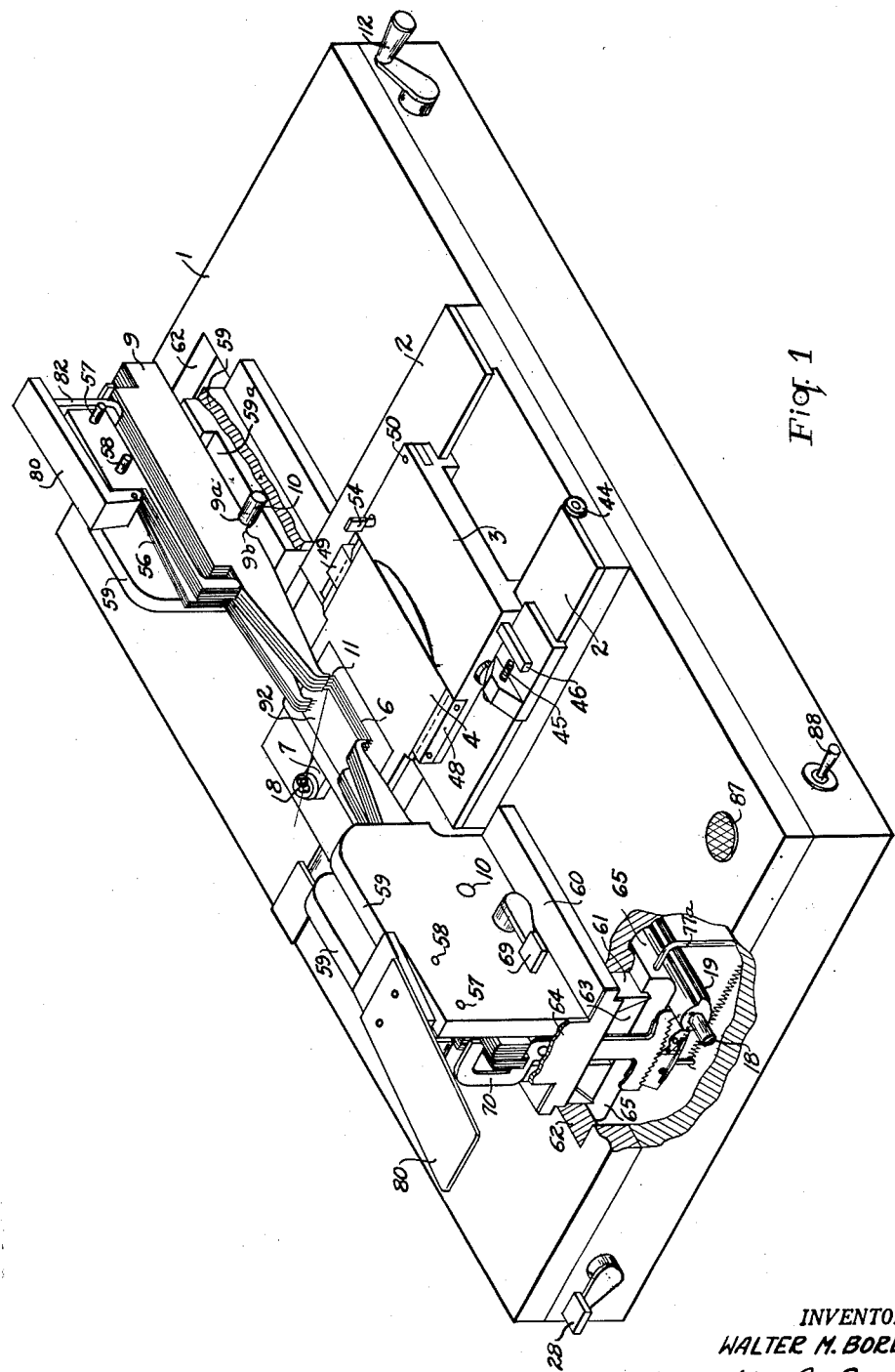

The invention generally comprises a table 1 to which are suitably fastened ways 2 for slidably supporting a platen carriage 3 onto which, in turn, is releasably attached a platen 4 carrying paper 92 upon which wire 6 is positioned by a threader arm 7 having a wire-engaging element 8 for positioning the wire to be selectively engaged by points 11 to form successive loops. These points are carried by levers 9 which, in turn, are provided with recesses 9a and 9b for selective pivotal engagement with pins 10. By means of a mechanism more particularly to be described hereafter, threader arm 7 is caused to be swung back and forth through an arc of approximately 180° to carry the wire 6 into position to be engaged by points 11 upon selective release of levers 9. The threader arm is also bodily moved with threader carriage 5 upon guideways 5a an amount corresponding to the distance between parallel threads of the wire 6 to properly position the wire for engagement by points 11.

Figures 5, 6, 7, 8:
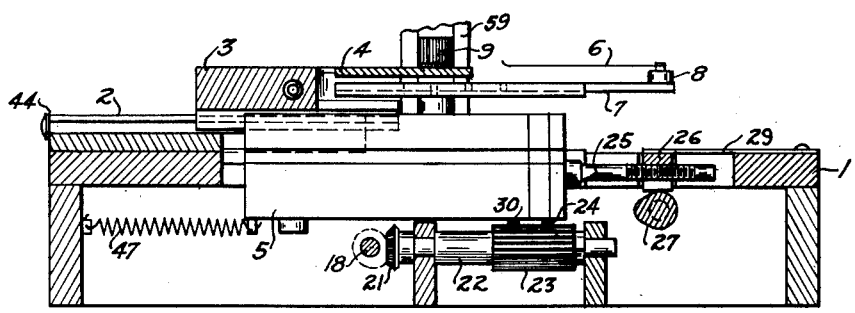
Fig. 5 is a transverse section taken generally on the line 5—5 of Fig. 2.
Fig. 6 is a top plan view of the threader carriage with the cover plate removed.
Fig. 7 is an enlarged sectional view taken generally along the line 7—7 of Fig. 6.
Fig. 8 is a diagram of the circuit for a safety lamp which indicates that the machine has been re-set for another operation.

Referring now to the mechanism for swinging and bodily moving the threader arm 7 and providing coordinate movement of the levers 9, there is provided a handle 12 (Fig. 2) to which a gear 13 is attached for engaging a gear 14 which, in turn, is attached to shaft 15. This shaft has fixed thereto the gear 16 for drivingly engaging the gear 17, in turn fixed to shaft 18. This shaft is provided with a pair of cam elements 19 for a purpose to be hereinafter more fully described. Also attached to shaft 18 is a gear 20 adapted to mesh with gear 21 connected, as shown in Fig. 5, to shaft 22 which, in turn, is provided with a pinion 23. Meshingly engaged with pinion 23 is a gear 24 to which is attached a lead screw 25 attached at one end to threader carriage 5 and threaded at the other end to engage with a split nut 26. This nut is fitted in table 1 and adapted to result in advance of the threader carriage in response to rotation of lead screw 25. A cam 27 is adapted to be operated by release lever 28 (Fig. 1) to move the split nut 26 upwardly against action of spring 29 to release the same to permit the carriage return spring 47 to move the threader carriage independently of the drive mechanism. Pinion 23 also drivingly engages gear 30 (see Fig. 7), attached to shaft 31 which, in turn, is provided with gear 32 adapted to mesh with gear 33. Integral with gear 33 is disc 37 to which is pivotally attached a rack 38 adapted to drivingly engage teeth 39 on shaft 40 for swinging threader arm 7. A roller 41 on rack keeper 42 holds the rack in engagement with teeth 39 by action of spring 43.

From the foregoing it may be seen that rotation of the handle 12 results in reciprocation of the threader arm 7 to position the wire for engagement by points 11 on levers 9 and for, at the same time, advancing the threader carriage to space the successive strands of the wire so positioned. For positioning the platen carriage there is provided an outer stop 44, an adjustable inner stop 45 and a stop pin 46. For releasably holding the platen 4 in position, there is provided a member 48 rigidly attached to the carriage and a member 49 pivotally attached thereto at 50 and held in operative position by a spring 51 attached at 52 to the carriage and at 53 to the member 49. A button 54 is provided for moving member 49 into platen releasing position.

Figure 2:
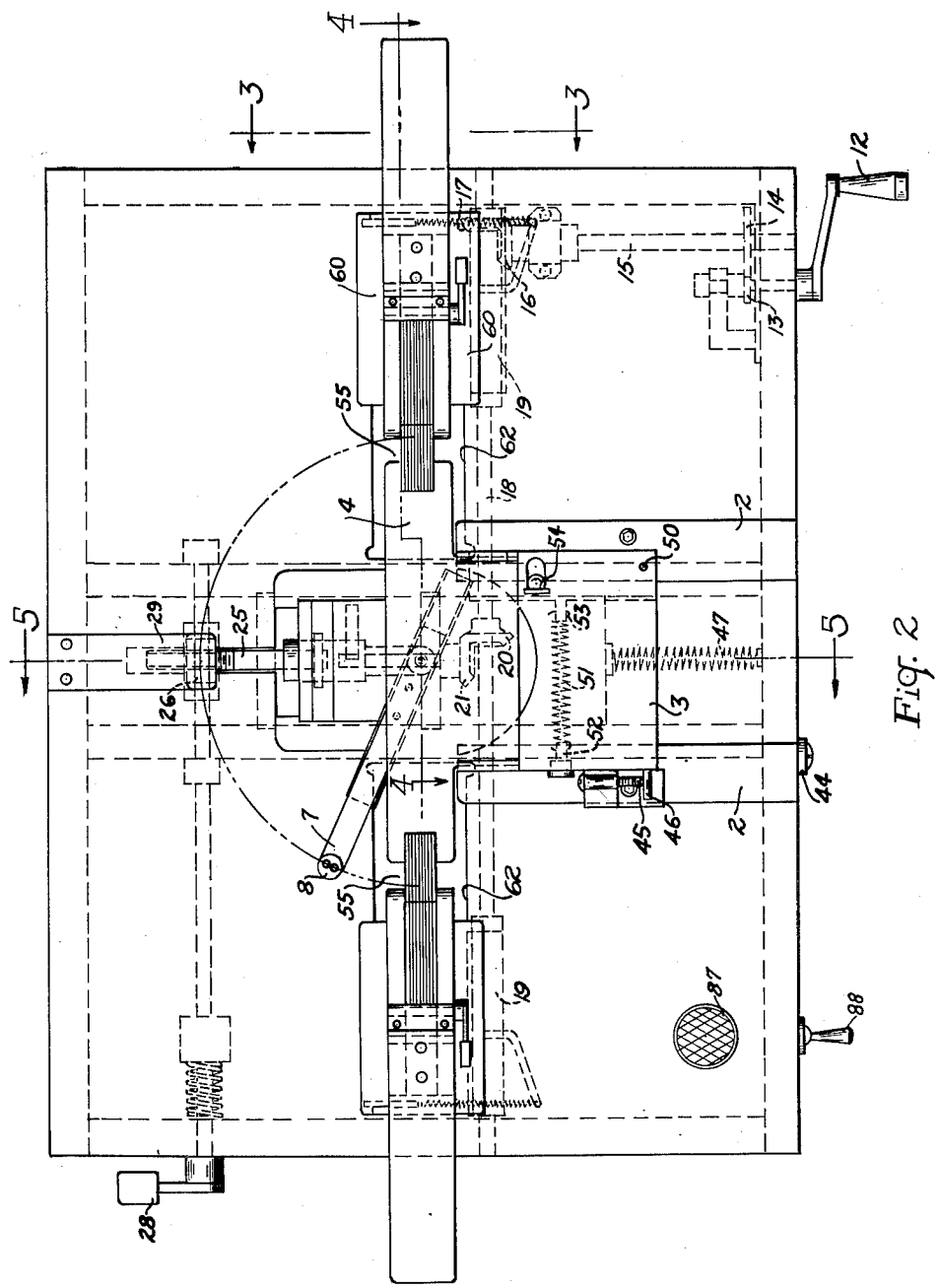
Fig. 2 is a top plan view of the device.

Coming now to the mechanism for causing points 11 on levers 9 to engage successive strands of wire 6 which have been positioned with respect thereto by threader arm 7, it may be noted that levers 9 are elongated to permit the threader arm to be received in one of the spaces 55 (Fig. 2) for positioning the wire to be engaged by successive points 11 of levers 9. These levers are urged by springs 56, one of which is provided for each lever 9. These springs are mounted for each set of levers on pins 57 and 58, carried by side plates 59. These side plates form, with other parts, a lever-carrying assembly adjustably mounted on table 1. Each of the side plates is provided with a flange 60 for riding on the upper surface of table 1 and a portion 61 for engaging the sides of a recess 62 in table 1. A recessed part 63 is provided in plates 59 for accommodating the movement of the escapement mechanism which is to be hereinafter more fully explained. An end plate 64 is suitably fastened to the side plates 59 to form the integral structure. For releasably fastening such integral structure to the table 1, and for holding it in any selected position upon movement thereof in the recess 62, there is provided a clamping shoe 65 adapted, as shown in Fig. 1, to engage the under side of table 1. This clamping shoe is carried by the side plates by means of eye-bolt 66 (see Fig. 4) having a recess 67 therein adapted to be actuated by cam shaft 68 to which is attached, as shown in Fig. 1, an actuating lever 69. As is readily apparent, actuation of lever 69 results in engagement or disengagement of the clamping shoe 65 with the under side of table 1 to hold the lever-carrying assembly in adjusted position with respect to table 1.

Figure 3:
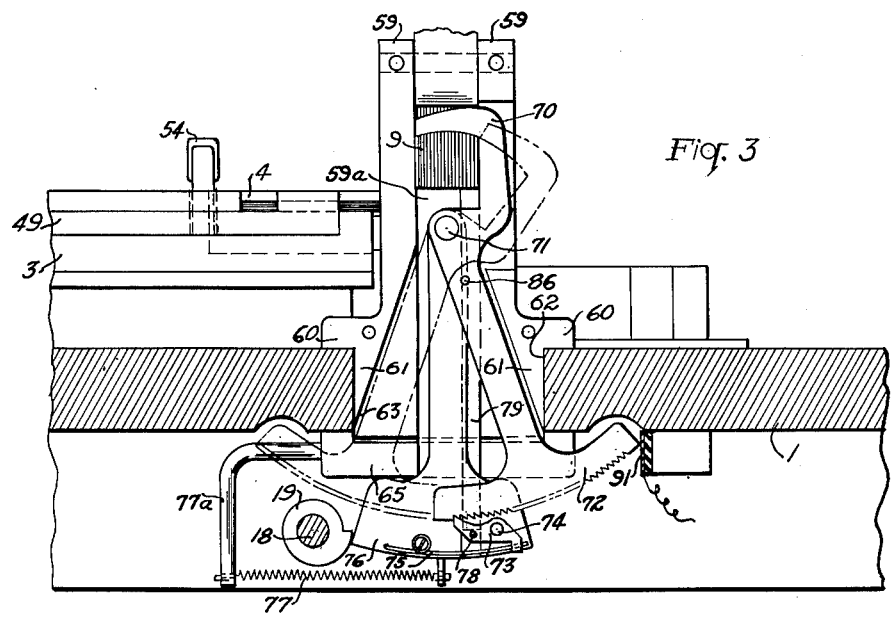
Fig. 3 is an enlarged fragmentary end view taken generally along the line 3—3 of Fig. 2.
Figure 4:
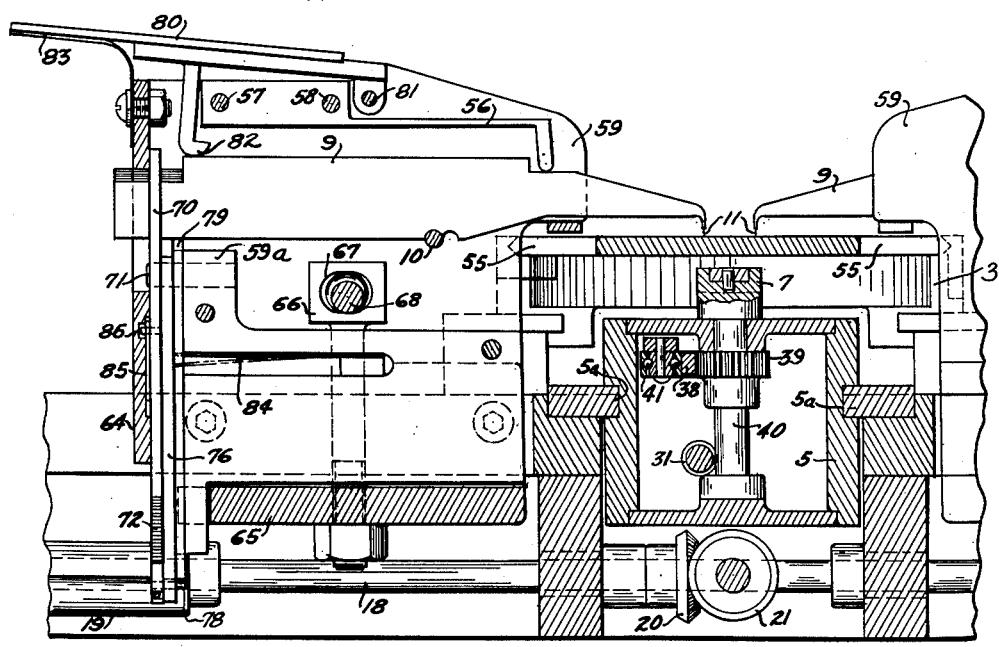
Fig. 4 is an enlarged fragmentary side elevation taken generally on the line 4—4 of Fig. 2 but with certain parts shown in differently adjusted position than in Fig. 2.

Coming now to the operation of the escapement mechanism and the means for moving levers 9 so that points 11 thereof will be placed in wire engaging position, there is provided, as shown in Figs. 1 and 3, a lever retaining hook 70 pivotally mounted at 71 to the end plate 64 and spacer 59a. The lever retaining hook is adapted to overlie the ends of levers 9 from a position as shown in full lines in Fig. 3 wherein the hook overlies all the levers, to the position shown in dotted lines where all the levers have been released. To bring about successive release of the levers in response to movement of the threader arm and the threader carriage, there is provided on hook 70 an escapement rack 72 adapted to be engaged by pawl 73 pivotally attached at 74 and urged into operative position by a spring 75, all of which is carried by an actuating arm 76 pivotally mounted at 71 and adapted to be actuated by cam 19. As will be apparent from Fig. 3, rotation of cam 19 results in movement of actuating arm 76 to move the same with respect to rack 72 whereby pawl 73 engages an adjacent tooth thereof. Continued rotation of the cam results in freeing actuating arm 76 to move in response to spring 77, carried by arm 77a, into a position along with rack 72 and retaining hook 70 to a position where another one of levers 9 is released. Successive rotations of the cam, of course, result in successive releases of levers 9. Pawl 73 is adapted to be manually released from the escapement rack by means of pin 78 thereon which is adapted to be engaged by a bar 79 slidably mounted in a recess, not shown, in spacer 59a. This bar is positioned, as shown in Fig. 4, to be engaged by the under side of levers 9 and to be actuated thereby upon re-setting of the levers by handle 80 pivotally mounted on the side plates at 81 and having a projection 82 thereon adapted to engage the upper portion of the levers 9. The handle 80 is normally held in retracted position by spring 83. Bar 79, likewise, is held in retracted position by spring 84 and retaining hook 70 is returned to its original position upon release of pawl 73 by means of spring 85 carried by the end plate and engaging pin 86 on hook 70.

A safety indicating arrangement is shown diagrammatically in Fig. 8. This arrangement is for the purpose of avoiding damage to the lever needle points. A lamp 87 is adapted to be illuminated when needle points are in the raised position so as to indicate to the operator that the machine is in condition for forming a new gauge. The circuit includes a line switch 88, a transformer 89, a relay 90, contacts 91—one for each lever retaining hook—and wired in series so that when the retaining hooks are fully returned the circuit will be closed and the lamp 87 lighted to so indicate.

In the operation of the device, levers 9 are first re-set by operation of handles 80. Platen 4, with a suitable piece of paper 92 placed thereon, is then positioned in the platen carriage and held by members 48 and 49. A strand of wire 6 is suitably positioned on the threader arm, one end of which is suitably attached to the paper and the other end of which is placed under a slight tension by means (not shown) such as by running the wire over a pulley and attaching a weight to it. Operation of handle 12 results in swinging the threader arm and movement of the threader carriage to position the wire successively under adjacent levers 9 which, in turn, are released by movement of the retaining hook in response to cam 19 to cause points 11 to engage and hold the wire in proper position until fixed to the paper as hereinafter described. Movement of the threader carriage is synchronized with the movement of the threader arm and levers so that successive loops are composed of parallel strands predeterminately spaced. Upon completion of the winding of the desired number of strands, the wire is cut and the electrical strain gauge is completed by cementing the wires so positioned to the paper carried on the platen, cementing over the strands of wire another piece of paper to enclose the wires. Resetting of the levers and disengagement of elements 11 from the strands of wire is accomplished by operation of handle 80. Suitable lead wires may also be attached to the wire forming the gauge. Gauges having loops of any desired length may be formed by moving the lever-carrying assembly with respect to the table. As previously explained, this may be accomplished by operation of lever 69 which releases shoe 65 from clamping engagement with the table to thereby permit desired movement of the assembly. If it is desired to obtain a gauge having alternately extending loops, levers 9 may be alternately positioned on pin 10 by means of recesses 9a or 9b. That is, some of the members 9 may engage pin 10 at recess 9a, with alternate members 9 engaging the pin at recess 9b. The action of the mechanism will be exactly the same as before, but the alternate loops of wire of the resulting strain gauge will extend beyond the other loops due to the repositioning of alternate levers 9.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Mechanism for forming electrical strain gauges composed of a thread of high resistance wire fixed between paper sheets comprising a table, platen means releasably attached to said table and adapted to hold a paper sheet in wire receiving position, wire engaging and retaining levers oppositely positioned with respect to said platen, releasable means for holding said levers in a retracted position, a threader carriage mounted on said table to move in a direction normal to said oppositely positioned levers, a threader arm pivotally mounted on said threader carriage, means for moving said threader arm successively to adjacent oppositely positioned levers, and means coordinated with the movement of said threader arm for releasing said levers and urging the same to wire engaging position and for moving said threader carriage to coordinate the position of said threader arm with successive adjacent levers.

2. Mechanism for forming electrical strain gauges composed of a thread of high resistance wire fixed between paper sheets comprising a table; platen means releasably attached to said table and adapted to hold a paper sheet in wire receiving position; lever assemblies adjustably mounted on said table, oppositely positioned with respect to said platen, and movable from a retracted position to a position for engaging and retaining wire positioned with respect to said platen, said levers having more than one pivot arrangement to thereby form gauges of different sizes and configurations; a threader carriage mounted on said table to move in a direction normal to said oppositely positioned assemblies; and means including a threader arm pivotally mounted on said carriage for positioning wire with respect to said platen.

WALTER M. BORER.

REFERENCES CITED

The following references are of record in the file of this patent:

UNITED STATES PATENTS

| Number | Name | Date |
|---|---|---|
| 2,046,461 | Johnson | July 7, 1936 |
| 2,047,717 | Van Dresser et al. | July 14, 1936 |
| 2,334,668 | Conner | Nov. 16, 1943 |
| 2,334,671 | Gibbons | Nov. 16, 1943 |
| 2,377,361 | Nalle | June 5, 1945 |
| 2,401,049 | Campbell | May 28, 1946 |
| 2,427,508 | Raspet | Sept. 16, 1947 |
| 2,439,548 | Planeta | Apr. 13, 1948 |